United States Patent
Taylor

[15] 3,675,658
[45] July 11, 1972

[54] CATHETER WITH VALVED FLUID RESERVOIR

[72] Inventor: Glenn N. Taylor, Barrington, Ill.

[73] Assignee: The Kendall Company, Boston, Mass.

[22] Filed: Sept. 3, 1970

[21] Appl. No.: 69,343

Related U.S. Application Data

[63] Continuation-in-part of Ser. No. 767,296, June 14, 1968.

[52] U.S. Cl. .......................... 128/349 BV, 251/4, 251/143
[51] Int. Cl. ................................................ A61m 25/00
[58] Field of Search ............ 128/348, 349 B, 349 BV, 350 R, 128/351, 344, 325, 246; 251/4, 143

[56] References Cited

UNITED STATES PATENTS

| 3,190,291 | 6/1965 | Foley | 128/349 BV |
| 3,275,001 | 9/1966 | Rosecrans | 128/349 BV |
| 274,447 | 3/1883 | Kennish | 251/143 |

*Primary Examiner*—Dalton L. Truluck
*Attorney*—John F. Ryan

[57] ABSTRACT

In a self-inflating catheter provided with a reservoir of fluid under pressure, the reservoir is provided with internal slit valves, opening by distortion under digital pressure, to control the flow of inflating fluid.

2 Claims, 6 Drawing Figures

PATENTED JUL 11 1972   3,675,653

CATHETER WITH VALVED FLUID RESERVOIR

This is a continuation-in-part of my application Ser. No. 767,296, filed Oct. 14, 1968, now abandoned. This invention relates to improvements in the structure of control valves for regulating the flow of inflation fluid in a catheter having a sterile, self-contained inflating means.

As set forth in U. S. Pat. No. 3,275,001, a catheter of the Foley type is provided with a fluid reservoir, under pressure, in such a fashion that by opening a reservoir valve at the desired moments, a part of the contents of the reservoir is expelled through a passageway or lumen to inflate a balloon placed near the distal end of the catheter. Such self-contained inflation devices are considered as an improvement over the conventional type of Foley catheter wherein sterile fluid must be introduced into the balloon by a hypodermic syringe at the time when inflation is desired.

For maximum utility the fluid must be retained under pressure in the reservoir until the catheter is in the desired position for inflation of the balloon to convert it to a retention-type catheter. This requires a valve arrangement, controllable at will by the operator, at or near the mouth of the reservoir.

Various valve arrangements have been proposed, from external metal clamps closing the reservoir outlet to manipulatable valves placed within the lumen connecting the pressurized reservoir with the balloon. Inner valves of the latter type heretofore proposed include blocking disks of resilient material which must be angularly displaced by pressure, or plugs which are temporarily sealed to the inner wall of the inflating lumen and must be displaced by twisting or stretching the lumen to break the adhesive bond.

External metal clamps are hard to open and provide an encumbrance to the neat and convenient packaging of self-inflating catheters in sealed and sterilized units. Nevertheless, although inner valves are very desirable, the inner valves proposed in the prior art have been so deficient in reliability or so difficult to open that present catheters of the self-inflating type are almost universally provided with external metal clamps, despite their undesirable features.

It is with improvements in the art of providing reliable and readily opened internal fluid control valves for self-inflating catheters that the present invention is concerned. It is an object of the invention to provide such a valve, capable of governing the flow of fluid from a pressurized fluid reservoir by the simple application and release of digital pressure on the appropriate portion of the lumen which connects the reservoir with the balloon.

The invention will be better understood with reference to the following description and the drawings, in which.

Figure 1:
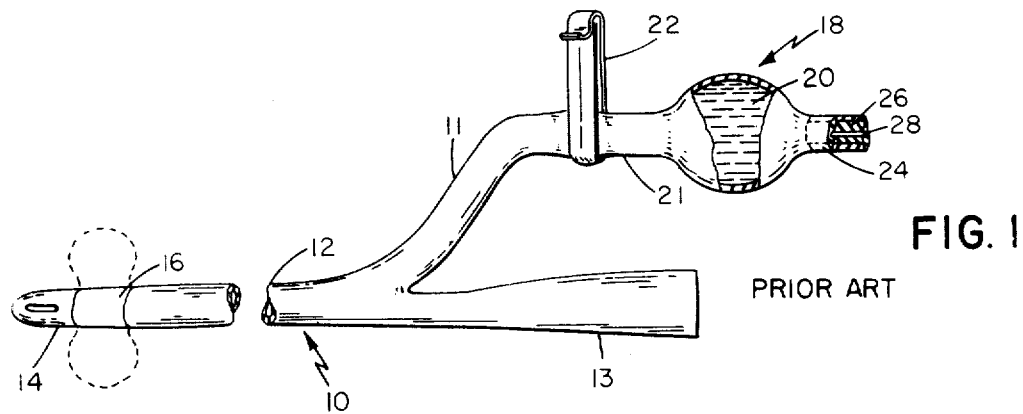
FIG. 1 is a schematic view, partially broken away, of a prior art catheter of the type to which the present invention relates.

Referring to FIG. 1, a conventional self-inflating catheter 10 is shown as comprising a resilient flexible hollow plastic tube 12 with distal portion 14 and proximal portion 13. The catheter is also provided with a sidearm tube 11, terminating in an enlargement 18, constituting a fluid reservoir, within which a fluid 20 such as sterile water is contained. The reservoir is provided with an outlet portion 21, through which fluid can pass into he lumen of the sidearm tube 11 to inflate the balloon 16 in the distal portion of the catheter to its inflated configuration as shown by the dotted lines. The lumen connecting the fluid with the balloon is conventional and is not shown. The pressurized reservoir 18 is also provided with an inlet portion 24, through which the fluid is conveniently introduced into the reservoir at the time the catheter is readied for use. The inlet portion is conventionally provided with a so-called Gilbert plug consisting of a plug of soft resilient rubber 26 with an inner lumen 28. Customarily the reservoir 18 is filled with fluid under pressure by the introduction of a hypodermic needle through the lumen of the plug and through the solid wall portion thereof. Upon discharge of the fluid into the reservoir and subsequent withdrawal of the needle, the self-sealing nature of the plug confines the fluid in the reservoir. The outlet end 21 of the reservoir is maintained in a closed position by a metal or plastic clamp of clip 22, which constricts the lumen of the sidearm tube 11. The structure set forth above is prior art.

Figure 2:
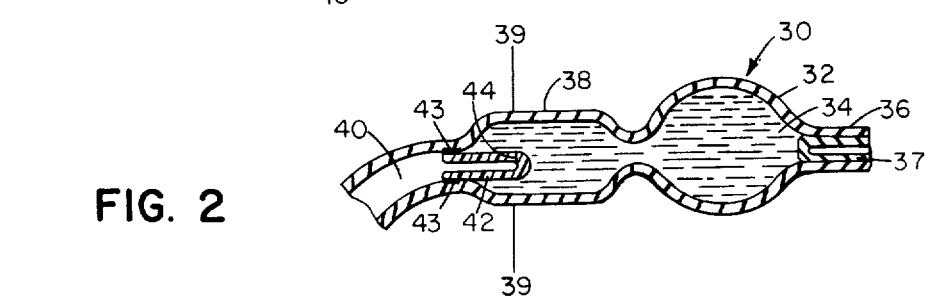
FIG. 2 is a cross-sectional view of a pressurized fluid reservoir containing one embodiment of the valve of this invention, in closed position.

FIG. 2 represents an embodiment of the present invention where the objectionable external clamp 22 of FIG. 1 has been replaced by as easily manipulatable inner valve 42 placed in the outlet portion 38 of the pressurized fluid reservoir. In more detail, the reservoir 30 with walls 32 contains sterile fluid 34 under pressure. The inlet portion 36 of the reservoir is closed by the Gilbert plug 37. The outlet portion 38 of the reservoir is closed by means of a slit valve 42, of a resilient, deformable plastic material, which may be of the same material as the main body of the catheter: that is, of rubber or a rubber-like synthetic elastomer. The valve 42, as shown, is in the shape of one half of a tubular capsule open at one end and closed at the other, but provided with a slit which is cut completely through a portion of the wall of the valve and which hence is capable of being opened by distortion when external pressure is applied. In stand-by configuration, the slit is closed and the fluid 34 is thereby prevented from flowing into the lumen 40 of the sidearm. The valve 42 is peripherally sealed by an adhesive to the inner wall of the sidearm, as shown by the adhesive deposit 43. Alternatively, the valve may be stabilized in position by an external constricting ring, or by a tight fit with the inner wall of the catheter sidearm.

The slit valve 42 is shown in FIGS. 2 through 6 in its preferred location: that is, with the outlet portion 38 of the reservoir constituting a cylindrically shaped elongation of the reservoir 30. Such an arrangement affords the operator the maximum facility in locating and dilating the valve 42. However, it is also possible to seal the valve 42 directly into the outlet portion of a generally spherical reservoir, provided that the slit portion of the valve is free from contact with the walls of the reservoir.

Figure 3:
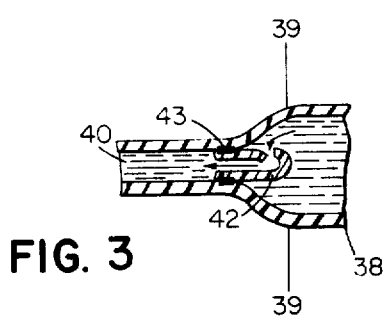
FIG. 3 is a cross-sectional view of the outlet end of the reservoir showing the valve under pressure and in an open position.

When pressure is applied to the outlet portion of the reservoir, as at the points 39—39, the valve 42 is compressed, opening the slit 44 to the configuration shown in FIG. 3. This allows the pressurized fluid to flow out of the reservoir and into the lumen 40 of the sidearm tube, thereby fulfilling its function of inflating the retention balloon. Due to the resilient nature of the elastomeric plug 42, the slit 44 may be opened by digital pressure as exerted by squeezing the opening portion 38 of the reservoir between the thumb and forefinger, or much more conveniently than by opening the prior art metal clamps, which is an operation requiring both hands.

To insure proper functioning, the fluid pressure in the filled reservoir must exceed the pressure needed to inflate the retention balloon, and the slit valve must withstand that pressure until it is opened by manipulation. The retention balloon inflation pressure varies from 8 to 9 pounds per square inch to 14 pounds per square inch, depending on the size of the catheter. Normally, to promote proper inflating of the balloon portion, the reservoir of the catheter is filled with between 5 and 15 cubic centimeters of water, under a pressure of between 10 and 30 pounds per square inch. In order to prevent leakage, it has been found that slit valve 42 should have a wall thickness of between 0.065 and 0.090 inches. Valves of this wall thickness resist opening under the operative water pressures, yet open readily under digital manipulation.

Figure 4:
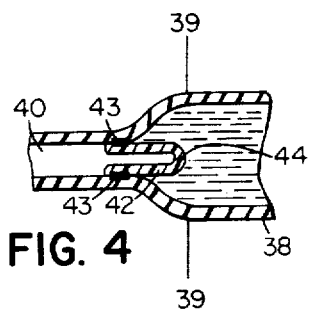
FIG. 4 is a cross-sectional view of another valve modification of this invention.
Figure 5:
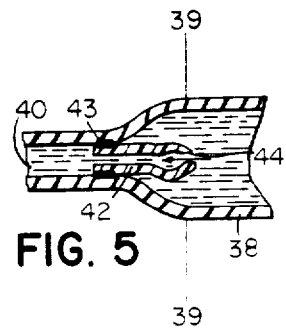
FIG. 5 is a cross-sectional view of the valve of FIG. 4, under pressure and in open position.

Considerable latitude may be exerted in the placement of the slit 44 in the elastomeric slit valve 42. In FIGS. 4 and 5 a slit valve, in closed and open positions, is shown wherein the slit 44 is made horizontally through the closed tip of the valve, rather than vertically through the upper wall as in FIGS. 2 and 3. The operation of the valve is substantially the same, with pressure applied at the points 39—39 of FIG. 4 causing the deformable elastomeric valve 42 to assume the configuration shown in FIG. 5.

Figure 6:
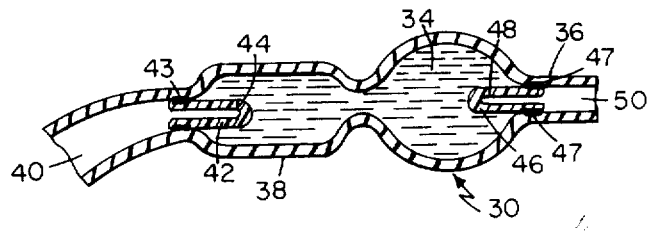
FIG. 6 is a cross-sectional view of another embodiment of the invention wherein both ends of the reservoir are provided with internal valves.

If desired, a slit valve may replace the conventional Gilbert plug in the inlet portion of the pressurized reservoir, as well as in the outlet end. Such an arrangement is shown in FIG. 6, where a slit valve 46, with slit 48, is adhesively bonded by adhesive 47 to the inner wall of the inlet lumen 50, or mechanically stabilization a set forth above. When the inlet portion 36 of the reservoir is compressed, the slit 48 in the slit valve 46 is opened, allowing fluid under pressure to be introduced through the lumen 50 to pressurize the reservoir 30. When the desired amount of fluid has been introduced, release of pressure on the inlet portion of the reservoir causes the slit valve to close. In this manner, when a retention catheter with an inflated balloon is to be removed, the application of digital pressure simultaneously at the inlet and outlet ends of the reservoir will open both deformable slit valves, thus allowing the balloon to collapse and fluid to drain therefrom.

Having thus described my intention, I claim:

1. In a retention-type catheter containing a self-inflating mechanism comprising a reservoir filled with fluid under pressure, said reservoir having an outlet portion connected by a lumen to an inflatable retention balloon situated in the distal end of said catheter, and a substantially oppositely-placed inlet portion, that improvement which comprises the provision in at least the outlet portion of said reservoir of a soft, resilient hollow cylindrical slit valve with one closed end, the closed end of said valve being oriented toward said reservoir, the closed end of said valve containing a slit which opens by distortion upon the application of digital pressure on the side walls of said valve and closes upon the release of said pressure, the fluid pressure in the reservoir being in excess of the pressure needed to inflate the retention balloon but less than the pressure needed to open said slit valve.

2. A catheter according to claim 1 in which a pair of resilient slit valves of the type described therein are fixed into both the inlet and the outlet portions of the reservoir, the closed ends of both valves being oriented toward said reservoir.

* * * * *